United States Patent Office 2,745,050
Patented May 8, 1956

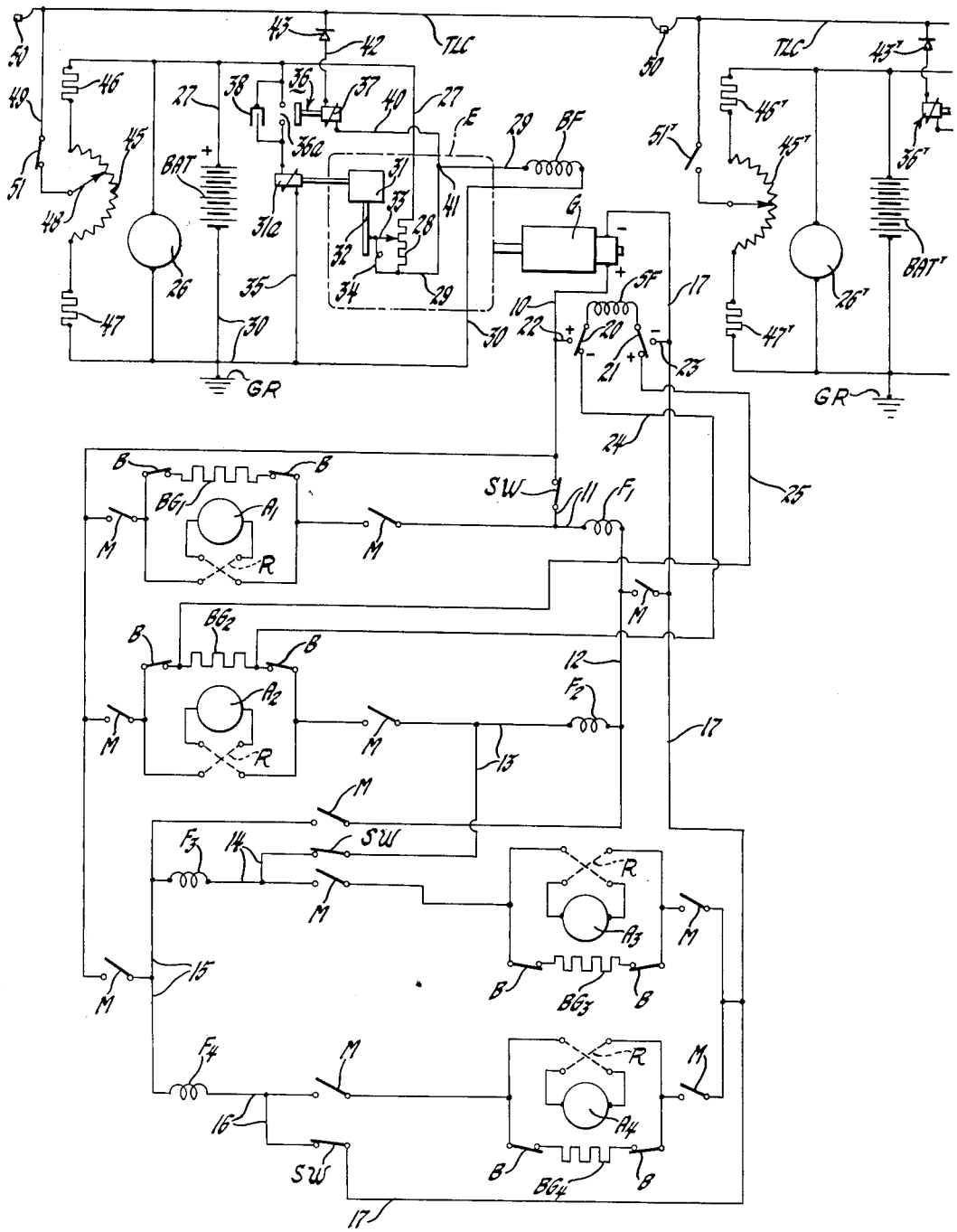

2,745,050

LOCOMOTIVE DYNAMIC BRAKING SYSTEM

Lauren L. Johnson, Westchester, Richard M. Dilworth, Hinsdale, and Albert N. Addie, La Grange Park, Ill., assignors to General Motors Corporation, Detroit, Mich., a corporation of Delaware Application January 2, 1952, Serial No. 264,624

16 Claims. (Cl. 318—367)

This invention relates to electric traction and control systems for locomotives, and more particularly to improvements in dynamic braking control means therefor.

In relatively heavy diesel locomotives generally in use in this country a maximum desirable dynamic braking effort if about 11 percent of the axle loading may be obtained throughout the locomotive speed range by a known dynamic braking control system wherein the armature current developed by the traction motors when said motors are being driven by the locomotive during dynamic braking is maintained at about 600 amperes, which is about the highest allowable armature current. While locomotives used in the United States may have an axle loading of the order of 60,000 lbs., many locomotives designed for use in other countries are lighter and may have an axle loading of only about 40,000 lbs. If the known braking control system used on such heavy locomotives were applied to such lighter locomotives, the maximum braking effort in percentage of axle loading would be 16.3, which is considered excessive; and therefore it would be necessary to reduce the motor field excitation so as to limit the motor armature current to about 515 amperes. Such a reduction in the motor field excitation and motor current would yield a maximum braking effort of 4700 lbs. per motor or 11.8 percent of the axle loading weight. While this arrangement is desirable at low speeds, as 15 miles per hour or below, if the armature current of 515 amperes were maintained at increased locomotive speeds, maximum desirable braking would not be obtained.

The present invention provides an improved dynamic braking system particularly designed for relatively light locomotives, as, for example, locomotives having an axle loading in the neighborhood of 40,000 lbs. According to the invention, during dynamic braking the locomotive generator is excited by a constant main or battery field current which, in a locomotive having an axle loading of the order of 40,000 lbs., may be of the order of 55.2 amperes. During dynamic braking the generator shunt field is connected directly across a dynamic brake grid so that the voltage across the shunt field opposes the voltage across the battery field, so that the resulting generator armature current is sufficient to produce a motor field current of about 540 amperes at 15 miles per hour to obtain the desired maximum braking effort of the order of 4700 lbs. per motor.

With this arrangement, if the speed increases the motor armature current increases, resulting in an increased opposing voltage across the shunt field. This increased opposing voltage reduces the net generator field and consequently reduces the motor field so that not only is maximum usable braking effort at low speeds provided, but as the speed increases the motor armature current also increases, thereby providing substantially maximum allowable braking effort as the locomotive speed increases until the highest desirable motor armature current of approximately 600 amperes is obtained at about 70 miles per hour. This close approach to maximum allowable braking effort throughout the speed range is provided without any action on the part of the engineer or other operator to limit the motor armature current.

Lower braking efforts may be obtained by decreasing the generator battery field excitation below the value of 55.2 amperes set forth in the example above.

In known dynamic braking systems, where a plurality of diesel units are used in tandem, the available voltage from the voltage source in the lead unit is divided among the units. In the dynamic braking system of the present invention a relatively high, substantially constant magnitude of battery field excitation current is used, as for example 55.2 amperes, and therefore a large percentage of the voltage developed by the voltage source of each diesel unit must be supplied to the main generator battery field in that unit. The present invention provides a novel means whereby, in a tandem arrangement of diesel units, the battery field of each diesel unit is supplied from a source in that individual unit, and a novel control means is provided in the lead or control unit for remotely controlling the magnitude of the battery field excitation current in the subsidiary units.

Other features and advantages of the invention will be apparent from the following description and from the drawing, which is a schematic diagram of a dynamic braking system constructed in accordance with the present invention.

Referring more particularly to the drawing, a diesel engine prime mover E is shown directly connected to a compound electric traction generator G for supplying power and excitation current to traction motors having series field windings F1, F2, F3 and F4 respectively, and armatures A1, A2, A3 and A4 respectively. Each motor armature is operatively connected in conventional manner to a separate locomotive driving axle (not shown) having traction wheels thereon engaging track rails. Conventional switching means for properly connecting the armatures of the traction motors for forward or reverse movement of the locomotive are indicated by the reference characters R. Suitable remotely controlled series and parallel motor switches M are included in the power circuit connections from the generator G. These switches may be closed in different combinations in conventional manner to connect the motors in series—parallel or parallel power locomotive driving circuit relation with the generator G. Remotely controlled motor field switches SW and remotely controlled motor armature braking switches B are also provided. In the schematic diagram all the switches are shown in braking position, wherein the switches SW are closed so that the motor field windings F1, F2, F3 and F4 are connected in series across the generator G for excitation thereby. This series circuit extends from the positive terminal of the generator G through a lead 10, switch SW, lead 11, winding F1, lead 12, winding F2, lead 13, a second switch SW, lead 14, winding F3, lead 15, winding F4, lead 16, a third switch SW, and lead 17 to the negative terminal of the generator.

When the switches B are closed, they connect each of the motor armatures A1, A2, A3 and A4 respectively, across separate dynamic braking resistance grids, BG1, BG2, BG3 and BG4, each of these grids being of similar resistance value. The above described connections cause the motors to operate as separately excited generators, and as the motors are driven by the locomotive they have a braking effect and retard movement of the locomotive. The power generated by the motor armatures is dissipated in heat by the respective braking grids BG1, BG2, BG3 and BG4. The motor armature current tends to increase with increase in speed of the locomotive, and in known systems this increase in current may be limited by decreasing the generator excitation current.

The generator G has a main or battery field BF connected across a source of voltage in a manner to be hereinafter described in detail, and the generator has a shunt field SF having one end connected to the movable pole of a double throw switch 20 and having the other end connected to the movable pole of a double throw switch 21. When the switches 20 and 21 are in the normal locomotive driving position, i. e., the position other than that shown—the shunt field is connected across the generator armature, the movable pole of the switch 20 connecting with a lead 22 which is connected by lead 10 to the positive terminal of the generator armature, and the movable pole of the switch 21 connecting with a lead 23 which is connected by lead 17 to the negative terminal of the generator armature. The switches 20 and 21 are operated simultaneously with the switches B, SW and M when the dynamic braking system is rendered operative. For a disclosure of a means for applying a dynamic brake, reference is had to U. S. Patent 2,304,895, entitled "Dynamic Braking and Control System," issued December 15, 1942, in the name of R. M. Dilworth et al. and to the co-pending application of Richard M. Dilworth, filed December 14, 1949 as Serial No. 132,849, entitled, "Dynamic Braking Control," now Patent No. 2,591,791.

When in braking position, the switches 20 and 21 connect the generator shunt field SF directly across one of the braking grids, whereby the voltage across the shunt field is in opposing relation to the voltage across the main or battery field. The movable pole of switch 20, which, when in drive position, connects one end of the shunt field with the positive generator armature terminal, when in braking position connects said end of the shunt field to a lead 24, which lead is connected directly with the negative side of the braking grid BG2. Similarly, the movable pole of switch 21, when in braking position, connects the other end of the shunt field to a lead 25 which makes direct connection with the positive side of the braking grid BG2. With this arrangement, the shunt field is connected directly across the dynamic brake grid BG2 in such manner that the flux developed in each field is in opposition to the flux developed in the other field and the voltage of the shunt field opposes the battery field voltage and thereby reduces the net generator output.

In the example of the particular locomotive earlier referred to, the battery field of the generator is excited by a battery field current of 55.2 amperes, and the resulting generator armature current is sufficient to produce a motor field current of about 540 amperes at 15 M. P. H. This will provide a desired braking effort of about 4700 lbs. per motor. If the speed of the locomotive increases so that the motor armatures are driven faster, the motor armature current increases and results in an increase in voltage across the braking grid BG2 with a consequent increase in voltage across the shunt field SF, so that the net generator field (and hence the motor field) is reduced. This automatically results in a braking characteristic which provides the maximum usable braking effort at 15 M. P. H.—i. e. about 4700 lbs. per motor—and which approaches the maximum desirable motor armature current of 600 amperes as the speed increases, thereby permitting nearly maximum allowable braking throughout the locomotive speed range until the highest desirable motor armature current of 600 amperes is reached at about 70 M. P. H. This operation is entirely automatic and requires no action upon the part of the engineer or other operator to limit the motor armature current, inasmuch as the current flowing in the main or battery field of the generator remains constant.

The provision of a battery field current of 55.2 amperes has been arbitrarily chosen as an example and will provide a desired braking effort in a locomotive having an axle loading of about 40,000 lbs. Different braking efforts may be obtained by changing the magnitude of the generator battery field excitation.

The dynamic braking arrangement above described is readily applicable to a single locomotive unit. However, when a plurality of locomotive units are operated in tandem it is necessary to provide a control system to insure that the generator battery field in each locomotive unit is excited by a current of the same magnitude as is utilized in the lead or controlling locomotive unit, this current being 55.2 amperes in the example given.

In prior dynamic braking systems wherein control of the amount of braking is obtained by varying the amount of current flowing in the generator battery field, the available voltage of the lead or controlling locomotive unit is divided among all of the units of the tandem locomotive arrangement, and a variable resistance is provided in the lead unit to compensate when less than four locomotives are operated in tandem. In the braking system of this invention a large percentage of the available voltage from the voltage source in each unit must be supplied to the generator battery field of that unit since the battery field remains constant during the braking effort; and the invention includes a novel control circuit for providing this result.

The main or battery field BF of the generator G is connected across a source of voltage comprising a battery BAT and an auxiliary generator 26 connected in parallel with the battery. In the example given, the battery may provide a potential of about 73 volts. A lead 27 is connected between the positive terminal of the battery and one end of a load regulator rheostat 28, and the other end of the rheostat is connected by a lead 29 to one end of the battery field BF. The other end of the battery field is connected by a lead 30 to the negative battery terminal.

The effective resistance of the rheostat 28 is controlled by a governor 31 which operates a vane motor shaft 32, said shaft carrying a contact 33 which is slidable along the rheostat 28 and which is connected by a flexible connector 34 to lead 29.

The governor and vane motor arrangement may be of a type well understood in the art, and reference may be had to patent application 132,849, now Patent No. 2,591,791, for a detailed description of the operation thereof.

An over-ride solenoid coil 31a is connected to the governor to operate the governor in known manner as described in detail in Patent 2,304,895 and in an application 132,849, now Patent No. 2,591,791. Solenoid 31a is connected across the battery between leads 27 and 30 by means of a lead 35 which incorporates normally open contacts 36a of a relay 36 having an operating coil 37. The contacts 36a are bridged by a condenser 38 to prevent arcing. The operating coil 37 of the relay has one side thereof connected by a lead 40 to a point 41 in the lead 29 between the rheostat 28 and the battery field BF, and the other side of the relay is connected to a train line conduit TLC by means of a lead 42 which incorporates a rectifier 43. The rectifier may be a copper oxide or selenium type rectifier. A source of control voltage is provided by a potentiometer 45 which is connected across the source of voltage, series resistors 46 and 47 being connected in series in this circuit on opposite sides of the potentiometer to prevent shorting of the voltage source and to limit the range of control. The potentiometer has a wiper arm 48 which is connected by a lead 49 with the train line conduit TLC.

In the operation of the braking system, the operator sets the potentiometer wiper arm 48 in a position to provide a desired amount of dynamic braking effort. The potentiometer, of course, may be calibrated to indicate a number of settings for various braking efforts. Current from the source (the battery BAT and auxiliary generator 26) flows through the load regulator rheostat 28 and the battery field BF, this current being limited by the amount of effective resistance of the loading regulator rheostat 28. The relay 36 is quite sensitive, preferably operating at a voltage differential of about one volt across the coil 37, and consequently if the voltage at point 41 is greater than the voltage at the lead 49 by about one volt the relay will operate to bridge the normally open contacts 36a and close the circuit through the override solenoid 31a. The solenoid when energized acts through the governor to move the vane shaft 32 to increase the effective resistance of the load regulator rheostat 28, thereby reducing the voltage at point 41. When the voltage at point 41 is no longer one volt greater than the voltage at lead 49 the relay 36 is de-energized and the contacts 36a are opened. The rectifier 43 prevents reverse current flow through the relay, and consequently the over-ride solenoid 31a is de-energized. The vane shaft 32, which is spring biased, then moves to decrease the effective resistance of the rheostat 28, thereby increasing the voltage at point 41 to cause a recurrence of the above sequence. The net effect of the control arrangement is to cause a substantially constant current to be supplied to the battery field BF for any given setting of the potentiometer wiper arm 48, the means for varying the resistance of the load regulator rheostat 28 being controlled as a function of the magnitude of the control voltage at the potentiometer wiper arm 48 and the voltage drop across the load regulator rheostat 28.

The control system above described preferably is included in each unit where a group of locomotives are operated in tandem, couplers 50 being provided to couple the train line conduits TLC of the various units. However, the potentiometer setting need be made in only the lead or control locomotive unit, and in any subsidiary units the potentiometer may be disconnected by opening switch 51. A portion of the circuit in a subsidiary locomotive unit is shown as comprising a potentiometer 45' connected through series resistors 46' and 47' across a voltage source for the subsidiary unit comprising an auxiliary generator 26' and a battery BAT'. Relay 36' of the subsidiary unit is connected to the train line conduit TLC through rectifier 43', but switch 51' is open so that relay 36' is controlled by voltage from the voltage source in the lead unit. The negative sides of the batteries in the lead and controlling units may be connected to a common ground such as the rails or else connected together by suitable negative train line conductors to complete the potentiometer circuit through the train line conductors TLC. The negative sides of the batteries BAT and BAT' have been shown grounded as at GR and GR' respectively.

While we have shown and described one embodiment of our invention, it is capable of many modifications. Changes therefore, in the construction and arrangement may be made without departing from the spirit and scope of the invention as set forth in the appended claims.

What is claimed is:

1. Control apparatus for a dynamic braking system, comprising: a source of voltage; a generator having a main field connected across said source; a variable impedance connected in series with said field across said source; electrically operated means for varying said impedance; means providing a control voltage for controlling the operation of said impedance varying means; and coupling means for connecting said control voltage to other impedance varying means, said other impedance varying means being operable to vary impedance in series with a second voltage source and main generator field in a similar subsidiary dynamic braking system.

2. Control apparatus for a dynamic braking system, comprising: a source of voltage; a generator having a main field connected across said source; a variable impedance connected in series with said field across said source; solenoid operated means for varying said impedance; means for developing a control voltage; and a relay having normally open contacts in series with said solenoid and having an operating coil connected between said field and said control voltage developing means for controlling the operation of said impedance varying means as a function of the voltage drop across said variable impedance.

3. Apparatus of the character claimed in claim 2, including a rectifier connected in series with the operating coil of said relay to prevent reverse current operation thereof.

4. Control apparatus for a dynamic braking system, comprising: a source of voltage; a generator for exciting elements in the braking system, said generator having a main field connected across said source; a variable resistance connected in series with said field across said source; means for varying said resistance; a solenoid connected across said source for operating said resistance varying means; variable means for developing a control voltage; a sensitive relay having normally open contacts in series with said solenoid and having an operating coil connected between said field and said control voltage developing means for controlling the operation of said resistance varying means as a function of the magnitude of said control voltage and the voltage drop across said resistance; and a rectifier connected in series with the operating coil of said relay for preventing reverse current operation thereof.

5. Control apparatus for a dynamic braking system, comprising: a source of voltage; a generator for exciting elements in the braking system, said generator having a main field connected across said source; a variable resistance connected in series with said field across said source; means for varying said resistance; a solenoid connected across said source for operating said resistance varying means; variable means for developing a control voltage; a sensitive relay having normally open contacts in series with said solenoid and having an operating coil connected between said field and said control voltage developing means for controlling the operation of said resistance varying means as a function of the magnitude of said control voltage and the voltage drop across said resistance; a rectifier connected in series with the operating coil of said relay for preventing reverse current operation thereof; and coupling means for connecting said control voltage to other resistance varying means, said other resistance varying means being operable to vary resistance in series with a second voltage source and main generator field in a similar subsidiary dynamic braking system.

6. Control apparatus for a plurality of dynamic braking systems, each comprising: a source of voltage; a generator for exciting elements in the braking system, said generator having a main field connected across said source; a variable resistance connected in series with said field across said source; means for varying said resistance; a solenoid connected across said source for operating said resistance varying means; a potentiometer connected across said source and having a movable arm for developing a variable control voltage; a sensitive relay having normally open contacts in series with said solenoid and having an operating coil connected between said field and said potentiometer arm for controlling the operation of said resistance varying means as a function of the magnitude of said control voltage and the voltage drop across said resistance; a rectifier connected in series with the operating coil of said relay for preventing reverse current operation thereof; and coupling means for connecting said control voltage to the other of said plurality of dynamic braking systems.

7. A dynamic braking system of the character described, comprising: a traction motor having an armature and a field winding; a resistance grid adapted to be connected across said armature; a generator having a main field and a shunt field; means for connecting said generator to said field winding to provide excitation thereof; switch means for connecting said shunt field directly across said grid, whereby the flux developed in the shunt field is in opposing relation to the flux developed in the main field; a source of voltage; a circuit connecting the main generator field across said source; a variable impedance connected in series with said main field across said source; electrically operated means for varying said impedance; and means providing a control voltage for controlling the operation of said impedance varying means.

8. A dynamic braking system of the character described, comprising: a traction motor having an armature and a field winding; a resistance grid adapted to be connected across said armature; a generator having a main field and a shunt field; means for connecting said generator to said field winding to provide excitation thereof; switch means for connecting said shunt field directly across said grid, whereby the flux developed in the shunt field is in opposing relation to the flux developed in the main field; a source of voltage; a circuit connecting the main generator field across said source; a variable impedance connected in series with said main field across said source; electrically operated means for varying said impedance; means providing a control voltage for controlling the operation of said impedance varying means; and coupling means for connecting said control voltage to similar subsidiary dynamic braking systems including other impedance varying means connected to said control voltage and sensitive thereto, said other impedance varying means being operable to vary impedance in series with a voltage source and main generator field in each of said similar subsidiary dynamic braking systems.

9. A dynamic braking system of the character described, comprising: a traction motor having an armature and a field winding; a resistance grid adapted to be connected across said armature; a generator having a main field and a shunt field; means for connecting said generator to said field winding to provide excitation thereof; switch means for connecting said shunt field directly across said grid, whereby the flux developed in the shunt field is in opposing relation to the flux developed in the main field; a source of voltage; a circuit connecting the main generator field across said source; a variable resistance connected in series with said main field across said source; means for varying said resistance; a solenoid connected across said source for operating said resistance varying means; variable means for developing a control voltage; a sensitive relay having normally open contacts in series with said solenoid and having an operating coil connected between said field and said control voltage developing means for controlling the operation of said resistance varying means as a function of the magnitude of said control voltage and the voltage drop across said resistance; and a rectifier connected in series with the operating coil of said relay for preventing reverse current operation thereof.

10. A locomotive dynamic braking system of the character described, comprising: a traction motor adapted to drive the locomotive or to be driven thereby, said motor having an armature and a field winding; a resistance grid adapted to be connected across said armature; a generator having a main field and a shunt field normally connected to the generator; means for connecting said generator to said field winding to provide excitation thereof; leads adapted to connect said shunt field directly across said grid; switch means for simultaneously connecting said grid across said armature and disconnecting said shunt field from said generator and connecting it to said leads, whereby the flux developed in the shunt field is in opposing relation to the flux developed in the main field; a source of voltage; a circuit connecting the main generator field across said source; a variable impedance connected in series with said main field across said source; solenoid operated means for varying said impedance; means for developing a control voltage; and a relay having normally open contacts in series with said solenoid and having an operating coil connected between said field and said control voltage developing means for controlling the operation of said impedance varying means as a function of the voltage drop across said variable impedance.

11. A locomotive dynamic braking system of the character described, comprising: a traction motor adapted to drive the locomotive or to be driven thereby, said motor having an armature and a field winding; a resistance grid adapted to be connected across said armature; a generator having a main field and a shunt field normally connected to the generator; means for connecting said generator to said field winding to provide excitation thereof; leads adapted to connect said shunt field directly across said grid; switch means for simultaneously connecting said grid across said armature and disconnecting said shunt field from said generator and connecting it to said leads, whereby the flux developed in the shunt field is in opposing relation to the flux developed in the main field; a source of voltage; a circuit connecting the main generator field across said source; a variable resistance connected in series with said main field across said source; means for varying said resistance; a solenoid connected across said source for operating said resistance varying means; variable means for developing a control voltage; a sensitive relay having normally open contacts in series with said solenoid and having an operating coil connected between said field and said control voltage developing means for controlling the operation of said resistance varying means as a function of the magnitude of said control voltage and the voltage drop across said resistance; and a rectifier connected in series with the operating coil of said relay for preventing reverse current operation thereof.

12. A locomotive dynamic braking system of the character described, comprising: a traction motor adapted to drive the locomotive or to be driven thereby, said motor having an armature and a field winding; a resistance grid adapted to be connected across said armature; a generator having a main field and a shunt field normally connected to the generator; means for connecting said generator to said field winding to provide excitation thereof; leads adapted to connect said shunt field directly across said grid; switch means for simultaneously connecting said grid across said armature and disconnecting said shunt field from said generator and connecting it to said leads, whereby the voltage across the shunt field is in opposing relation to the voltage across the main field; a source of voltage; a circuit connecting the main generator field across said source; a variable resistance connected in series with said main field across said source; means for varying said resistance; a solenoid connected across said source for operating said resistance varying means; a potentiometer connected across said source and having a movable arm for developing a variable control voltage; a sensitive relay having normally open contacts in series with said solenoid and having an operating coil connected between said field and said potentiometer arm for controlling the operation of said resistance varying means as a function of the magnitude of said control voltage and the voltage drop across said resistance; a rectifier connected in series with the operating coil of said relay to prevent reverse current operation thereof; and coupling means for connecting said control voltage to similar subsidiary dynamic braking systems.

13. A dynamic braking control system comprising a plurality of dynamic braking systems each including; a generator having a main field, a voltage source and a variable impedance in electrical circuit with said field for varying the strength of said field, and electrically operated means for varying said impedance; said dynamic braking control system having means included in one of said dynamic braking systems to provide a control voltage for controlling the operation of each of said impedance varying means; and connecting means extending between said dynamic braking systems to connect said control voltage to each of said impedance varying means.

14. A dynamic braking control system comprising a plurality of dynamic braking systems each including; a traction motor having an armature and a field winding, a resistance grid adapted to be connected across said armature, a generator having a main field and a shunt field, means for connecting said generator to said field winding to provide excitation thereof, switch means for connecting said shunt field directly across said grid whereby the flux developed in the shunt field is in opposing relation to the flux developed in said main field, a voltage source, a circuit connecting the main generator across said source, a variable impedance connected in series with said main field across said source, and electrically operated means for varying said impedance; said dynamic braking control system having manually operated means included in one of said dynamic braking systems to provide a control voltage for controlling the operation of each of said impedance varying means; and connecting means extending between said dynamic braking systems to connect said control voltage to each of said impedance varying means.

15. A dynamic braking system of the character described comprising: a traction motor having an armature and a field winding; a resistance grid adapted to be connected across said armature; a generator having a main field and a shunt field; means for connecting said generator to said field winding to provide excitation thereof; and switch means for connecting said shunt field directly across said grid, whereby the flux developed in the shunt field is in opposing relation to the flux developed in the main field.

16. A locomotive dynamic braking system of the character described comprising: a traction motor adapted to drive the locomotive or to be driven thereby, said motor having an armature and a field winding; a resistance grid adapted to be connected across said armature; a generator having a main field and a shunt field normally connected to the generator; a variable impedance in circuit with said main field; means for connecting said generator to said field winding to provide excitation thereof; leads adapted to connect said shunt field directly across said grid; and switch means for simultaneously connecting said grid across said armature and disconnecting said shunt field from said generator and connecting it to said leads, whereby the flux developed in the shunt field is in opposing relation to the flux developed in the main field.

References Cited in the file of this patent

UNITED STATES PATENTS

| | | |
|---|---|---|
| 1,641,679 | Hull | Sept. 6, 1927 |
| 2,132,960 | Montrose-Oster | Oct. 11, 1938 |
| 2,177,850 | Vogt et al. | Oct. 31, 1939 |
| 2,304,895 | Dilworth et al. | Dec. 15, 1942 |
| 2,565,118 | Binney et al. | Aug. 21, 1951 |
| 2,591,791 | Dilworth | Apr. 8, 1952 |
| 2,627,597 | Johansson | Feb. 3, 1953 |